A. D. LIGHTNER AND E. HOLMES.
VEHICLE LIFTING MEANS.
APPLICATION FILED NOV. 29, 1918.
1,376,445.
Patented May 3, 1921.
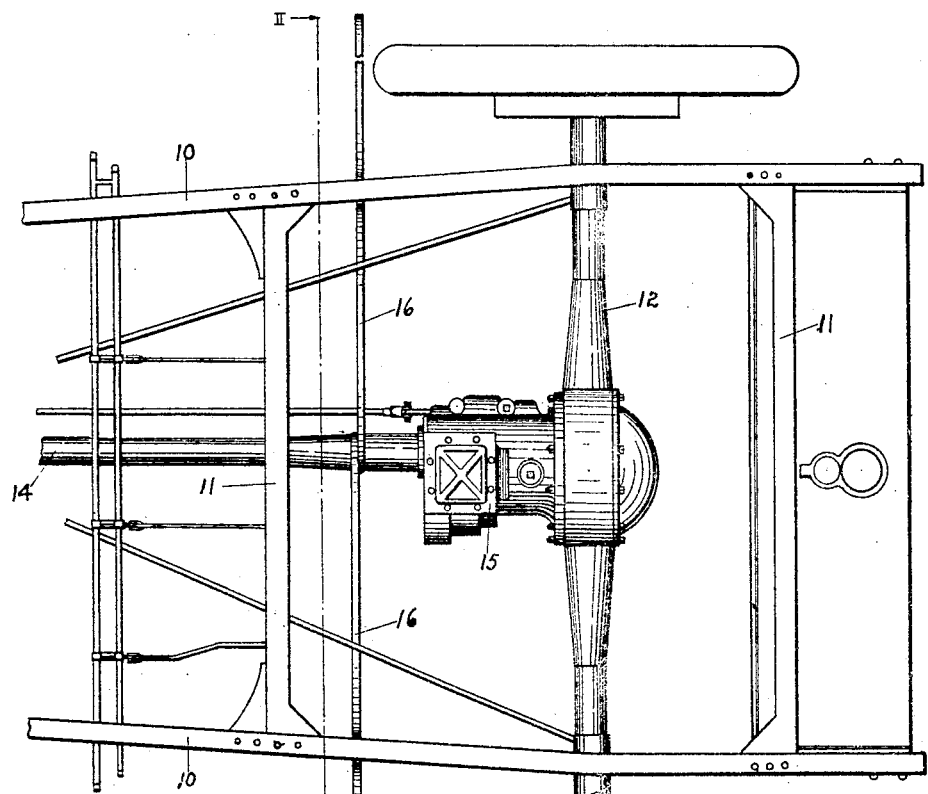
Fig. I.
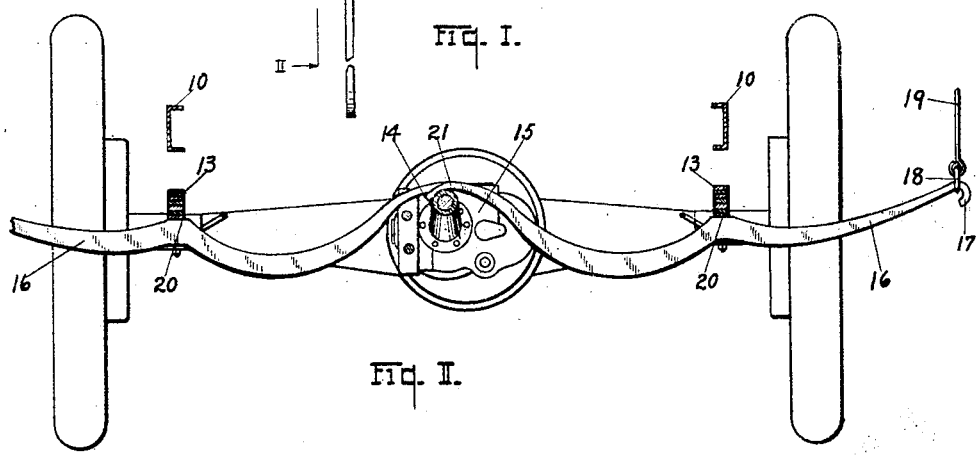
Fig. II.
INVENTORS
Arthur D. Lightner.
BY Edward Holmes.
ATTORNEY

UNITED STATES PATENT OFFICE.

ARTHUR D. LIGHTNER AND EDWARD HOLMES, OF TOLEDO, OHIO, ASSIGNORS TO THE WILLYS-OVERLAND COMPANY, OF TOLEDO, OHIO, A CORPORATION OF OHIO.

VEHICLE-LIFTING MEANS.

1,376,445.      Specification of Letters Patent.      Patented May 3, 1921.

Application filed November 29, 1918. Serial No. 264,576.

*To all whom it may concern:*

Be it known that we, ARTHUR D. LIGHTNER and EDWARD HOLMES, citizens of the United States, residing at Toledo, county of Lucas, and State of Ohio, have invented certain new and useful Improvements in Vehicle-Lifting Means, of which we declare the following to be a full, clear, and exact description.

This invention relates to improvements in vehicle lifting means, and more particularly to that type of vehicle lifting means adapted for use upon an automobile for lifting the rear portion thereof.

One object of the invention is to provide improved devices of this character which may be readily attached to automobiles of ordinary construction, for the purpose of raising the same, and readily detached therefrom when desired.

A further object of the invention is to provide devices of this character which are of simple construction, and which may be readily transported from place to place, as desired.

Further objects, and objects relating to economies of manufacture and details of construction will definitely appear from the detailed description to follow.

We accomplish the objects of our invention in one instance by the devices and means described in the following specification. A structure constituting one embodiment of our invention, which may be the preferred, is illustrated in the accompanying drawing, forming a part hereof, in which:

Figure I is a top plan view of an automobile frame, having the body removed, and showing the application of our improved lifting means thereto.

Fig. II is a vertical sectional view, taken along the line II—II of Fig. I, illustrating the position of our improved lifting means when placed in operative position.

In the drawing, similar reference characters refer to corresponding parts throughout the several views, and the sectional view is taken looking in the direction of the small arrows at the ends of the section line.

The automobile illustrated in the accompanying drawing is of the ordinary type, having a frame portion, comprising the side frame members 10 and transverse frame members 11, supported upon the rear axle casing 12 by the usual springs 13 of the semi-elliptic type which are secured to the rear axle casing and the longitudinal frame members in the usual manner. The propeller shaft casing 14 is connected to the rear axle casing 12 through the transmission casing 15 in the usual manner.

The lifting devices comprise two members or levers 16, so formed that they may be detachably secured to the sides of the vehicle, as shown in the drawings. Each of the members 16 is formed of an elongated bar provided with a bent portion 17 at the outer extremity thereof, which is adapted to receive a ring or link 18, whereby the end of the bar is connected to a lifting cable 19. A flattened portion 20 is formed upon the upper surface of the bar, at such a point in its length as will enable the flattened portion to bear against the lower face of the spring, as shown in Fig. II, when the lifting member is placed in operative position. The inner ends of the members 16 are provided with a curved portion 21 which, when the members are placed in operative position, curve downwardly and are adapted to overlie the upper surface of the propeller shaft casing and bear thereupon.

The lifting device comprises two members 16, both formed in such a manner that they may be detachably secured to the rear portion of the vehicle, as shown on the drawing. When it is desired to lift the rear portion of the vehicle, the inner curved end of each member 16 is placed over the top of the propeller housing in such a manner that the flattened surface 20 bears against the lower face of the corresponding spring 13, and the hooked portion 17 extends outwardly beyond the side of the vehicle in position to be attached to the cable. The ring 18 carried by the hoisting cable 19 is then slipped over the hooked end of the member, and when both members have been thus placed in position and connected to the corresponding hoisting cable, the devices are in such position that a uniform pull upon the two hoisting cables will raise that portion of the automobile to which the hooks are secured, in such a manner as to prevent tilting of the same.

While the above described lifting devices are capable of use under any circumstances in which it is desired to raise an automobile from the surface upon which it rests, they are particularly adapted for use in doubledecking automobiles when it is desired to suspend one automobile above another, as for a shipment in railroad cars. It is evident that the invention provides a simple and strong lifting means and any possibility of the same disengaging while the automobile is suspended is entirely eliminated, and as the inner ends of the members, which extend over the propeller casing, are suitably curved, the casing will not be injured by the application of the members thereto. The lifting members act as levers with the opposite side springs serving as fulcrums. By constructing the members of the above description, they may be easily and quickly attached to and detached from the automobile without the use of tools.

While we have described our invention in more or less detail, and as being embodied in certain precise forms, we do not desire or intend to be limited thereto, but on the contrary our invention contemplates broadly all proper changes, such as circumstances may suggest or conditions render expedient.

Having thus described our invention, what we claim as new and desire to secure by Letters Patent, is:

1. In devices for lifting and suspending automobiles, a pair of lever members, each of which is provided at one end with a curved portion adapted to bear upon the upper surface of a propeller shaft, a portion intermediate its ends for engagement with a portion of the automobile frame, and a hook at the opposite end for connection to a hoisting mechanism.

2. A device of the class described comprising in combination members adapted to extend under the side portions of a vehicle and over a central portion thereof, the inner ends of said members being constructed to prevent their displacement upon said central portion and the other ends being arranged to receive means by which the vehicle may be lifted.

3. A device for lifting and suspending motor vehicles comprising two members adapted to extend transversely beneath the body of the vehicle and arranged to project laterally beyond the sides thereof, the inner ends of said members being adapted to overlie the propeller shaft housing of the vehicle and shaped to engage the same in such a manner as to obviate accidental outward movement of the members, said members being each adapted to engage the underside of a portion of the vehicle and means connected with the outer ends of the members forming suspension means for the vehicle.

4. A lever of the character described having a substantially central bearing portion adapted to engage the under side of an object to be raised and two curved arms on the opposite sides of said bearing portion, the extremity of one of the arms being curved to extend over and partially around another portion of the object and the extremity of the other arm being constructed to receive means for connecting the lever with a hoisting mechanism.

In testimony whereof, we affix our signatures.

ARTHUR D. LIGHTNER.
EDWARD HOLMES.